(12) United States Patent
Gray

(10) Patent No.: US 6,269,990 B1
(45) Date of Patent: Aug. 7, 2001

(54) HOLDER FOR AN ELONGATE DEVICE

(75) Inventor: Lindsay T. Gray, Jandakot (AU)

(73) Assignee: Taylor's Beach Pty Ltd, Jandakot (AU)

( * ) Notice: Subject to any disclaimer, the term of this patent is extended or adjusted under 35 U.S.C. 154(b) by 0 days.

(21) Appl. No.: 09/456,600

(22) Filed: Dec. 8, 1999

(30) Foreign Application Priority Data

Jan. 22, 1999 (AU) ............................................. B 13227/99
Jul. 26, 1999 (AU) ................................................. 41140/99

(51) Int. Cl.⁷ .................................................. A01K 97/10
(52) U.S. Cl. ......................... 224/200; 224/222; 224/251; 224/267; 224/922; 43/21.2; D3/221
(58) Field of Search ..................................... 224/197, 200, 224/222, 251, 267, 271, 272, 922; 43/21.2; D3/221

(56) References Cited

U.S. PATENT DOCUMENTS

| | | |
|---|---|---|
| 2,969,899 | 1/1961 | Brooks . |
| 3,006,588 | 10/1961 | Lemi . |
| 5,588,630 | 12/1996 | Chen-Chao . |
| 5,601,356 * | 2/1997 | McWilliams .................. 224/901.4 X |
| 5,956,883 * | 9/1999 | Krouth et al. .................... 224/922 X |
| 6,003,746 * | 12/1999 | Richardson ........................... 224/200 |
| 6,029,872 * | 2/2000 | Ellington .............................. 224/251 |

* cited by examiner

*Primary Examiner*—Stephen K. Cronin
(74) *Attorney, Agent, or Firm*—Greenwald & Basch LLP; Duane C. Basch

(57) ABSTRACT

The present invention is an apparatus for holding an elongate device such as a fishing rod, and includes a tube for receiving an end of the fishing rod to a depth effective to retain the fishing rod therein and, a leg brace for releasable attachment to a leg of the user. The tube is attached to the leg brace by an adjustable pivot coupling so that the attitude of the tube, and thus a device supported therein, can be adjusted relative to the leg of the user. The leg brace includes a shaped rigid member that partially surrounds the leg, and a plurality of straps. The straps are arranged in pairs on opposite sides of the member and have one end attached to the member and a free end adapted to engage the opposite strap of the same pair to secure the member to the user's leg.

11 Claims, 1 Drawing Sheet

HOLDER FOR AN ELONGATE DEVICE

The present invention relates generally to a holder for an elongate device and in particular, but not exclusively, a holder for a fishing rod.

FOREIGN PRIORITY

Applicant claims the benefit of the following foreign patent application(s):

Australian Patent Application No. 41140/99 for a "HOLDER FOR AN ELONGATE DEVICE," by Lindsay T. Gray of Taylors Beach Pty Ltd, FILED Jul. 26, 1999; and its parent application AU-B-13227/99, "HOLDER FOR AN ELONGATE DEVICE," filed Jan. 22, 1999 and published as a Petty Patent on Jul. 15, 1999.

BACKGROUND AND SUMMARY OF THE INVENTION

Fishing rod holders for holding a fishing rod are well known. Such holders are typically in the form of tubes provided with a ground-engaging spike. In use, the holder is driven into the ground and upon casting of the fishing line, the rod is placed in the holder. The fisherperson is then free to do other things without the need to hold the rod. While this type of fishing rod holder performs its designed task very well, it does have several limitations. Significantly, it can only be used for beach or river fishing and only then when the sand is firm enough to hold the same. It is of no use in other types of fishing such as rock fishing, jetty fishing, boat fishing, etc. Also, the holder adds to the number or pieces of equipment that a fisherperson must physically hold and carry between say a vehicle and the actual fishing location.

The present invention was developed with a view to overcoming the above-mentioned problems with conventional fishing holders. Nevertheless, embodiments of the invention are not limited to use with fishing rods and can hold any type of elongate device.

In accordance with the present invention, there is provided a holder for an elongate device, said holder including: a tubular member for receiving an end of the elongate device to a depth effective to self retain said elongate device therein; a substantially rigid member shaped to partially surround a lower part of a leg of a user of the holder, said tubular member coupled to said rigid member in a manner to allow selective adjustment and fixing of the attitude of the tubular member relative to the leg; and at least one strap attached to said substantially rigid member and adapted to fasten about the lower leg of a user to fasten said holder to said lower leg, whereby, in use, said elongate device can be self supported in the holder while said holder is attached to the leg of the user.

In accordance with another aspect of the present invention, there is provided an apparatus for holding a fishing rod, comprising: a tubular member for receiving the handle of a fishing rod, said tubular member being of a length and diameter sufficient to retain the handle when said tubular member is maintained in a partially upright orientation; a leg brace, including a member shaped so as to partially surround a wearer's leg and flexible means for attaching the leg brace to the wearer's leg; a pivotable coupling connecting said tubular to said leg brace, said pivotable coupling suitable for maintaining a desired angular relationship between the tubular member and the leg brace.

Figure 1:
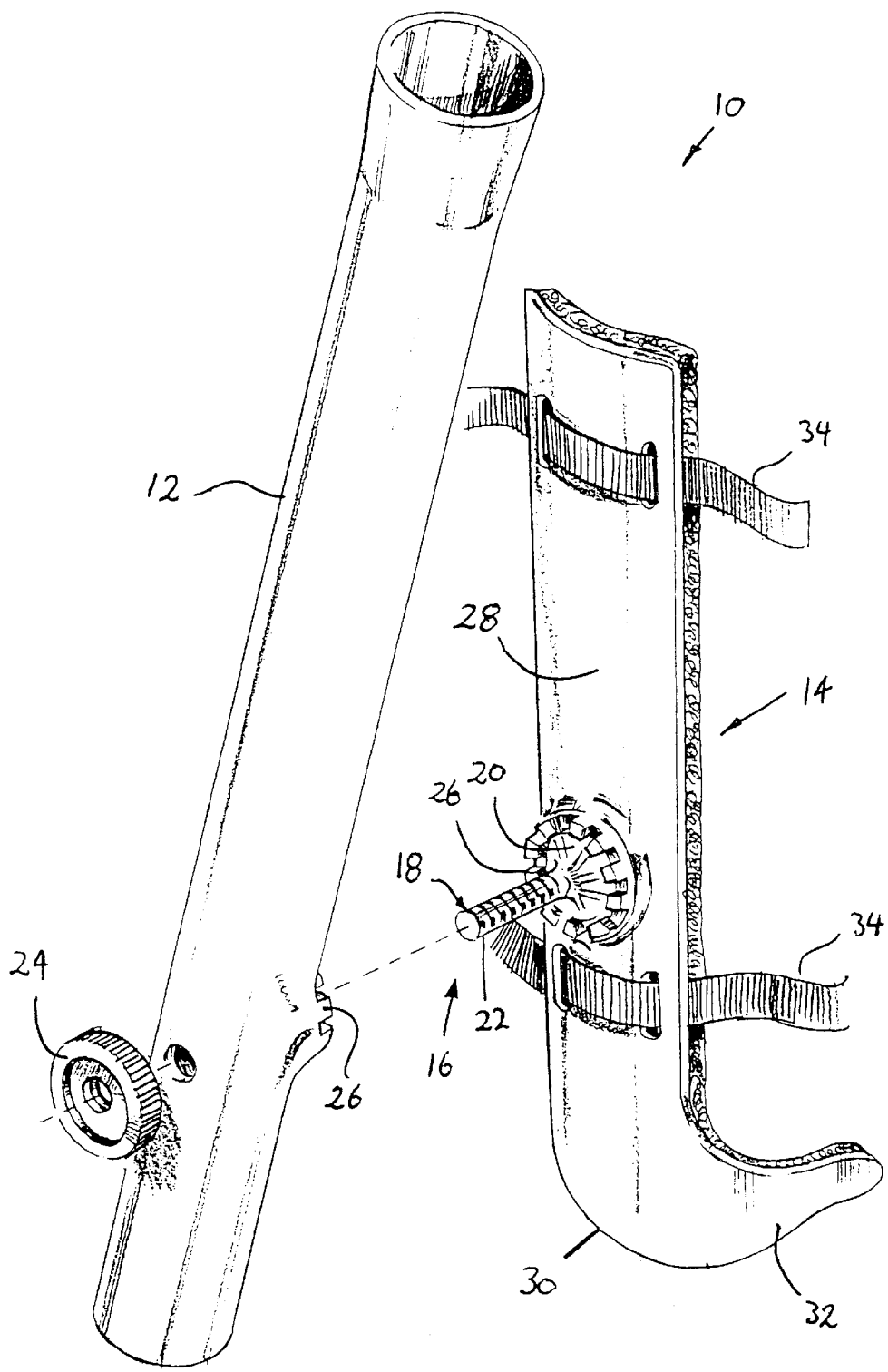
FIG. 1 is a perspective view of an embodiment of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawing. Referring to FIG. 1, a holder 10 for an elongate device such as a fishing rod (not shown) includes receiving means in the form of a tube 12 for receiving an end of the fishing rod to a depth effective in retaining the fishing rod therein and a leg brace 14 constituting means for releasably attaching the tube 12 to a leg of the user of the fishing rod. Thus, in use, with the holder 10 attached to the leg of the user, the user can insert the fishing rod in the tube 12, for the purposes of carrying the fishing rod and also to support the fishing rod when in use. In one embodiment, as depicted in FIG. 1, the tubular member may be flared at the end designed to receive the fishing rod handle so as to improve the ease with which such a handle may be inserted.

The leg brace 14 is coupled to the tube 12 via an adjustable pivot coupling 16 to enable selective adjustment of the attitude of the tube 12 relative to the user's or wearer's leg. The pivot coupling 16 can take any of a number of different forms. In perhaps the simplest embodiment, pivot coupling 16 comprises a bolt 18 having its head 20 coupled to the leg brace 14 and its shaft 22 extending through the tube 12. A nut 24 threadingly engages a free end of the shaft 22 extending outside the tube 12. By simply loosening and tightening the nut 24, the user is able to vary the attitude of the tube 12 to the leg of the user. As depicted in FIG. 1, nut 24 may be provided with a slotted or knurled outer diameter so as to improve the ease with which the nut is hand-tightened or loosened by the wearer.

The leg brace 14 includes a substantially rigid member 28 that is shaped to at least partially surround the lower part of the leg. To achieve this, the member 28 can be generally concavely curved so it can be placed over the side of a leg. Ideally, in use, this member 28 will be placed on the side of the leg distant the other leg. In its most basic form, the member 28 can be formed by cutting a cylindrical pipe vertically along its diameter or another chord. Lower edge 30 of the member 28 is adapted to rest on the foot of a user. This provides vertical support to the holder 10 so that it does not slip down the leg to say a position where it interferes with any footwear or engages the ground. To this end, the lower edge 30 may be provided with a lateral extension 32 that passes over and around the front of the user's foot (not shown).

In order to attach the member 28 to the user's leg, a plurality of flexible straps 34 are provided. As illustrated in FIG. 1, the straps 34 are threaded through slots in the rigid member 28, leaving each end free to engage the opposite strap end. Alternatively, the straps 34 may be arranged in pairs on opposite sides of the member 28 and have one end attached to the member 28 and a free end adapted to engage the opposite strap of the same pair. Most conveniently, the straps 34 can be provided with hook and loop fastener to allow easy attachment and detachment of the holder 10 from the leg. It is considered advantageous for at least one or both of the straps 34 in a pair to be elastically extendable.

In use, the member 28 is placed on the side of the leg with the lower edge 30 (and extension 32 provided) sitting near or resting on the foot. The straps 34 are then fastened together to secure the apparatus 10 to the leg. The handle end of a fishing rod can then be lowered into the tube 12. The fishing rod can then be carried in the holder 10 leaving the user's arms free to carry other equipment. When one is ready to commence fishing, the fishing line can be prepared while the rod is maintained within the holder 10. This again leaves the use of two free arms to prepare the line without having to hold the rod say under an arm while attaching swivels, floats, hooks and bait. It also avoids the need for a person to simply lay the fishing rod on the ground increasing the possibility of ingress of sand into a fishing reel attached to the rod. Once the line is cast, the fishing rod can be reinserted into the tube 12. The most comfortable attitude of the fishing rod can then be obtained by use of the pivot coupling 16 so as to pivot the tube 12 relative to the leg. It is envisaged that the preferred or most comfortable attitude of the fishing rod will change depending on the posture of the fisherperson.

Embodiments of the holder 10, when used in relation to rod and reel fishing, have numerous advantages over the prior art as it allows the fishing rod to be held irrespective of the type of fishing, e.g., rock fishing, beach fishing, reef fishing, boat fishing, pier/jetty fishing and chair fishing. Also, as previously explained, the holder 10 allows the wearer to always have both hands free for the preparation of the fishing line, the removal of the caught fish or the rebaiting of a hook. The ability to adjust the attitude of the tube 12 is beneficial as it allows fishing to continue whilst the user eats or reads while fishing.

Now that an embodiment of the invention has been described in detail it will be apparent to those skilled in the relevant arts that numerous modifications and variations may be made without departing from the basic inventive concepts. For example, the nut and bolt arrangement (18,24) depicted for providing the pivot coupling 16 can be replaced with any other functionally equivalent device. For example, pivot coupling 16 may include opposed tooth or notched discs or protrusions 26 formed on the tube 12 and member 28 that can be selectively engaged and disengaged to allow a step-wise adjustment of the attitude. The discs may be biased so as to normally engage each other to fix the attitude of the tube 12 whereby adjustment of the attitude is achieved by pulling the discs apart against the bias. Further, the member 28 can take any appropriate shape allowing it to sit over the lower leg. If desired, the material used for the member 28 can be mouldable so as to conform to the shape of a lower leg of the user. Indeed, in a further variation, the member 28 can be incorporated into a leg warmer type garment to be supported on the leg thereby doing away with the straps 34. This is somewhat similar to some types of shin pads that are incorporated into socks but with the foot part of the sock removed and the shin protection moved or extended to the side of the leg. Indeed in its most basic form, the rigid member 28 of the base 14 can be omitted so that the straps 34 or other attachment means are coupled directly to the tube 12. However it will be appreciated that in this embodiment, the attitude of the tube 12 is fixed relative to the leg. It is also believed that this may be less comfortable to a user. Finally, as the holder 10 is attached to one's leg it is always with you and therefore instantly accessible.

In recapitulation, the present invention is an apparatus for holding an elongate device such as a fishing rod, and includes a tube for receiving an end of the fishing rod to a depth effective to retain the fishing rod therein and, a leg brace for releasable attachment to a leg of the user. The tube is attached to the leg brace by an adjustable pivot coupling so that the attitude of the tube, and thus a device supported therein, can be adjusted relative to the leg of the user. The leg brace includes a shaped rigid member that partially surrounds the leg, and a plurality of straps. The straps are arranged in pairs on opposite sides of the member and have one end attached to the member and a free end adapted to engage the opposite strap of the same pair to secure the member to the user's leg.

It is, therefore, apparent that there has been provided, in accordance with the present invention, an apparatus for holding an elongate device. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A holder for an elongate device, said holder including:
   a tubular member for receiving an end of the elongate device to a depth effective to self retain said elongate device therein;
   a substantially rigid member shaped to partially surround a lower part of a leg of a user of the holder, said tubular member coupled to said rigid member in a manner to allow selective adjustment and fixing of the attitude of the tubular member relative to the leg; and
   at least one strap attached to said substantially rigid member and adapted to fasten about the lower leg of a user to fasten said holder to said lower leg, whereby, in use, said elongate device can be self supported in the holder while said holder is attached to the leg of the user;
   wherein said tubular member is coupled to said rigid member using a fastener, said fastener comprising
   a first end attached to said rigid member,
   a cylindrical middle section extending through said tubular member, and
   a second threaded end extending beyond the outer diameter of the tubular member, where the threaded end is suitable for receiving a bolt to tighten said tubular member to said rigid member and thereby allow the selective adjustment and fixing of the attitude of the tubular member relative to the leg.

2. The holder of claim 1, wherein said rigid member further includes a plurality of protrusions spaced in an arc about a longitudinal axis of said fastener, and where said tubular member further includes at least one protrusion positioned so as to engage one or more of said plurality of protrusions on said rigid member, thereby allowing the selective adjustment and fixing of the attitude of the tubular member relative to the leg.

3. The holder of claim 2, wherein the plurality of protrusions on the rigid member and the protrusion on the tubular member are provided by opposed-tooth discs associated with each of said members, wherein one or more opposed teeth on each of said discs engages the opposite teeth when the members are brought together by the tightening of said fastener.

4. A holder for an elongate device, said holder including:
   a tubular member for receiving an end of the elongate device to a depth effective to self retain said elongate device therein;
   a substantially rigid member shaped to partially surround a lower part of a leg of a user of the holder, said tubular member coupled to said rigid member in a manner to allow selective adjustment and fixing of the attitude of the tubular member relative to the leg, wherein said tubular member is coupled to said rigid member by each member being permanently affixed to one of a pair of notched discs, said discs being biased so as to normally engage one another, and where adjustment of the attitude of said tubular member is achieved by pulling the tubular member apart from the rigid member against the bias; and at least one strap attached to said substantially rigid member and adapted to fasten about the lower leg of a user to fasten said holder to said lower leg, whereby, in use, said elongate device can be self supported in the holder while said holder is attached to the leg of the user.

5. A holder according to claim 4, wherein a lower edge of said substantially rigid member is provided with a lateral extension that passes over the front of a foot of the leg of the user to which the holder is attached.

6. The holder according to claim 4, wherein the depth of the tubular member is of a length suitable for retaining substantially all of a handle of a fishing rod therein.

7. The holder of claim 4, wherein the at least one strap is elastically expandable.

8. The holder of claim 4, wherein the at least one strap has a pair of ends, a first end having a hook-type fastening material thereon and a second end having a loop-type fastening material thereon, wherein the first and second ends may be releasably attached to one another to fasten the strap and the rigid member to said lower leg.

9. An apparatus for holding a fishing rod, comprising:

a tubular member for receiving the handle of a fishing rod, said tubular member being of a length and diameter sufficient to retain the handle when said tubular member is maintained in a partially upright orientation;

a leg brace, including a member shaped so as to partially surround a wearer's leg and flexible means for attaching the leg brace to the wearer's leg wherein the leg brace further includes a lateral extension from a lower edge thereof that passes over the front of a foot on the leg of the user to which the apparatus is attached;

a pivotable coupling connecting said tubular member to said leg brace, said pivotable coupling suitable for maintaining a desired angular relationship between the tubular member and the leg brace.

10. The apparatus of claim 9, wherein the leg brace is a garment that is elastically supported on a wearer's leg.

11. The apparatus of claim 9, wherein the leg brace is constructed of a mouldable material so as to partially conform to the shape of a wearer's leg.

* * * * *